US012597113B2

(12) United States Patent (10) Patent No.: US 12,597,113 B2
Zhang et al. (45) Date of Patent: Apr. 7, 2026

(54) FABRIC DEFECT DETECTION METHOD

(71) Applicant: Hangzhou Dianzi University, Hangzhou City (CN)

(72) Inventors: Lingjun Zhang, Hangzhou City (CN); Hua Zhang, Hangzhou City (CN); Yifan Wu, Hangzhou City (CN); Yifei Wu, Hangzhou City (CN)

(73) Assignee: Hangzhou Dianzi University, Hangzhou City (CN)

( * ) Notice: Subject to any disclaimer, the term of this patent is extended or adjusted under 35 U.S.C. 154(b) by 260 days.

(21) Appl. No.: 18/483,396

(22) Filed: Oct. 9, 2023

(65) Prior Publication Data
US 2024/0193752 A1 Jun. 13, 2024

(30) Foreign Application Priority Data
Dec. 8, 2022 (CN) .......................... 202211571542.5

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01); *G06T 2207/30124* (2013.01)

(58) Field of Classification Search
CPC ......... G06T 7/0004; G06T 2207/20081; G06T 2207/20084; G06T 2207/30124; Y02P 90/30
See application file for complete search history.

(56) References Cited

U.S. PATENT DOCUMENTS

| | | | |
|---|---|---|---|
| 12,223,633 B2 * | 2/2025 | Sun ........................ | G06T 7/0008 |
| 12,406,337 B2 * | 9/2025 | Weinmann ................ | G06T 5/50 |
| 2021/0117717 A1 * | 4/2021 | Ha ......................... | G06V 10/764 |
| 2021/0142110 A1 * | 5/2021 | Tian ........................ | G06N 3/09 |
| 2023/0196541 A1 * | 6/2023 | Laszlo ................... | G06N 3/061 |
| | | | 382/141 |
| 2024/0193752 A1 * | 6/2024 | Zhang ................... | G06T 7/0004 |

FOREIGN PATENT DOCUMENTS

CN 107169956 B * 2/2020 ............. G06T 7/001

OTHER PUBLICATIONS

Almeida, Tomás, Filipe Moutinho, and João Pedro Matos-Carvalho. "Fabric defect detection with deep learning and false negative reduction." IEEE Access 9 (2021): 81936-81945. (Year: 2021).*

* cited by examiner

*Primary Examiner* — Bobbak Safaipour
(74) *Attorney, Agent, or Firm* — Tutunjian & Bitetto, P.C.

(57) ABSTRACT
The present disclosure provides a fabric defect detection method, including the following steps: constructing a data set; preprocessing the data set; constructing a region-based convolutional neural network (R-CNN) model for fabric defect detection; where the R-CNN model for fabric defect detection includes four convolutional layers, four max-pooling layers, and two fully connected layers; training the R-CNN model for fabric defect detection; and reducing a number of false negative (FN) samples by classification threshold reduction. The present disclosure provides a novel R-CNN model for fabric defect detection. The model provides a desirable feature detection accuracy, has a low running cost, and is easy to implement, such that the model can be better applicable to actual operations in an industrial environment.

5 Claims, 1 Drawing Sheet

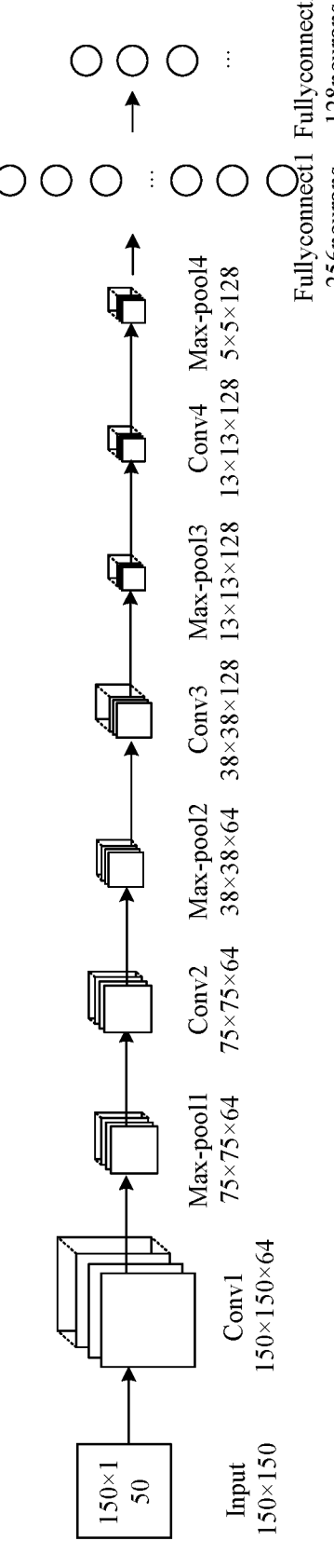

FABRIC DEFECT DETECTION METHOD

CROSS REFERENCE TO RELATED APPLICATION

This patent application claims the benefit and priority of Chinese Patent Application No. 202211571542.5, filed with the China National Intellectual Property Administration on Dec. 8, 2022, the disclosure of which is incorporated by reference herein in its entirety as part of the present application.

TECHNICAL FIELD

The present disclosure belongs to the field of defect detection, and in particular relates to a fabric defect detection method.

BACKGROUND

Defect detection plays an important role in the textile industry. The traditional detection method of fabric defects mainly relies on human eyes to distinguish defective products, and is time-consuming and has a high false detection rate. Therefore, manual detection cannot meet actual production needs. There is an urgent need to develop an automatic detection method of fabric defects to deal with the production of textile industry. Therefore, it is of great significance to develop a general, efficient, reliable, and accurate automatic detection algorithm for fabric defects. In the past decades, many researchers have proposed a large number of detection methods of fabric defects. These methods can be broadly categorized into traditional and learning-based methods:

1) traditional methods: traditional detection methods of a fabric defect; and
2) deep learning-based methods: detection methods of a fabric defect based on the deep learning.

Traditional detection algorithms for fabric defects mainly rely on manual feature extraction and cannot adaptively select features to detect defects in complex scenes. In recent years, deep convolutional neural network (DCNN) has achieved excellent performance in the fields of image recognition, image segmentation, and object detection. Accordingly, many researchers have applied CNN to fabric defect detection in recent years and achieved satisfactory results. Multiple experiments show that the CNN outperforms other traditional algorithms when trained on large industrial data sets. Compared with the traditional detection methods of fabric defects, deep learning can extract richer image features, and has stronger adaptability and detection accuracy.

Nowadays, computer vision and pattern recognition technologies have been widely used in the field of industrial surface defect detection. The automatic detection algorithm of fabric defects can improve a detection speed and reduce a labor cost by replacing the artificial vision. Moreover, through an automatic detection system of fabric defects, reliable data can be collected for report analysis and expanded applications.

Ross B. Girshick (RBG) et al. designed a region-based convolution neural network (R-CNN) model based on the CNN. The R-CNN optimizes methods for determining all possible target regions through a multi-scale windows sliding and methods for manually selecting features, such as HOG and SIFT. The R-CNN combines a candidate region algorithm Selective Search with the CNN to extract 2,000 candidate regions in an image. Compared with the previous windows sliding method, the R-CNN has made great progress, making the detection speed and accuracy significantly improved.

R-CNN is actually a structure including convolutional layers and fully connected layers. After the operation of multiple convolutional layers, an abstract representation of the image is finally obtained at different scales. The convolutional layer has a fixed parameter scale. Pooling layers are periodically inserted between the convolutional layers. The pooling layer gradually reduces a spatial size of the data body, and can reduce the number of parameters in the network, reduce computing resource consumption, and effectively control over-fitting. Finally, data processed by the convolutional layer and the pooling layer are input to a fully connected layer to obtain the desired result. The activation function is a function that runs on neurons of an artificial neural network and is responsible for mapping an input of the neuron to an output end.

The detection methods of fabric defects based on neural network have achieved desirable detection results. However, these methods still show certain problems during industrial practical application. Due to the large number of features in fabric defects, inter-class similarity and intra-class diversity may generate hundreds of types of defects in industrial production lines. Data acquisition is generally limited by insufficient availability of the defective samples and limitations of the image labeling process, thereby causing a large negative impact on accuracy.

SUMMARY

Aiming at the deficiencies in the prior art, the present disclosure provides a fabric defect detection method.

The present disclosure provides a fabric defect detection method, including the following steps:

step 1: constructing a data set;
step 2: preprocessing the data set;
step 3: constructing a region-based convolutional neural network (R-CNN) model for fabric defect detection; where
the R-CNN model for fabric defect detection includes four convolutional layers, four max-pooling layers, and two fully connected layers;
step 4: training the R-CNN model for fabric defect detection; and
step 5: reducing a number of false negative (FN) samples by classification threshold reduction.

Further, step 1 specifically includes:
adopting four different data sets, where in addition to three existing data sets of TILDA, MVTec, and Stains, a new self-built data set is constructed; the self-built data set includes two parts for a training phase and a testing phase, respectively; and the three existing data sets are only used during the testing phase; and
the self-built data set includes images from two different sources, namely a fabric defect sample image from Cotton Incorporated and a fabric image from network; the fabric defect sample images from Cotton Incorporated include 194 512×512 fabric images in six defect types, for comprehensive representation of fabric defect categories; in order to supplement and increase a number of samples in the self-built data set, the fabric images from network include texture images in six defect types, where each defect type includes 200 non-defective image samples and 10 defective image samples, there is only one defect in each image, a total of 1,454 images are used as samples, and the images are annotated with an open source tool Labelme.

Further, step 2 specifically includes:

(1) image size adjustment:

scaling the fabric defect sample images from Cotton Incorporated and the fabric images from network in the self-built data set through a resize function; and on the basis of an original image aspect ratio of 512×512, conducting shrinking and testing, finding an image size suitable for the R-CNN model, and determining that an input size is fixed at 150×150; and (2) gray level transformation:

a gray level of each pixel in the image is a weighted average of three monochromatic colors red (R), green (G), and blue (B):

$$D=0.299R+0.587G+0.114B$$

converting the images in the self-built data set into a gray level histogram, where the gray level of the pixel falls between 100 and 200, and details cannot be highlighted; correcting the gray level of the pixel in the image by gray level histogram equalization;

a formula of the gray level histogram equalization is as follows:

$$h(v) = \text{round}\left(\frac{cdf(v) - cdf(\min)}{cdf(\max) - cdf(\min)}\right) \times (L - 1)$$

L=256 is a gray level series, cdf is a cumulative distribution function, and min and max are minimum and maximum gray levels in the gray level histogram, respectively; and a round function returns an integer result after decimal rounding.

Further, step 3 specifically includes:

the R-CNN model for fabric defect detection includes the four convolutional layers, the four max-pooling layers, and the two fully connected layers;

each of the convolutional layers is connected with one of the max-pooling layers, and a last one of the four max-pooling layers is sequentially connected with the two fully connected layers; the four max-pooling layers each have a convolution kernel size of 2×2; the following table shows the four convolutional layers, the four max-pooling layers, and the two fully connected layers, as well as hyperparameters, and an input image is 150×150×1;

| Layer | Output feature map | Hyperparameter |
|---|---|---|
| Conv1 | 150 × 150 × 64 | F = 64, K = 5, S = 1, p = 2 |
| Max-pool 1 | 75 × 75 × 64 | S = 2 |
| Conv2 | 75 × 75 × 64 | F = 64, K = 5, S = 1, p = 2 |
| Max-pool 2 | 38 × 38 × 64 | S = 2 |
| Conv3 | 38 × 38 × 128 | F = 128, K = 3, S = 1, p = 2 |
| Max-pool 3 | 13 × 13 × 128 | S = 3 |
| Conv4 | 13 × 13 × 128 | F = 128, K = 3, S = 1, p = 2 |
| Max-pool 4 | 5 × 5 × 128 | S = 3 |
| Fully connected layer 1 | 256 | Neuron 256 |
| Fully connected layer 2 | 128 | Neuron 128 |

F represents a number of feature maps, K represents the convolution kernel size, S represents a convolutional stride, and p represents padding; and a neuron activation function is ReLu; and a loss function adopts binary cross-entropy loss, with a formula as follows:

$$\text{Loss} = \frac{-1}{N}\sum_{i=1}^{N} yi \cdot \log(p(yi)) + (1 - y_i)\log(1 - p(yi))$$

$y_i$ is a label with a value of 1; and p(yi) is a prediction result of N samples, that is, a probability that a sample is a defective image.

Further, step 4 specifically includes:

conducting visualizing intermediate activation, and visually displaying the feature maps output by each of the four convolutional layers and the four max-pooling layers in a R-CNN to verify a training situation of the network; where the visualizing intermediate activation is conducive to displaying characteristics of false positive and false negative samples to better debug the R-CNN model;

setting "batch_size" to 8, such that the R-CNN model selects batches of data each time during the training to allow processing to improve a training speed; and training the R-CNN model for fabric defect detection with a preprocessed self-built data set obtained in step 2 until the loss function reaches an optimal degree of convergence; and testing the R-CNN model for fabric defect detection on the four different testing data sets.

Further, step 5 specifically includes:

outputting a probability that a predicted image is a defect function through sigmoid using the fully connected layer 2 of the R-CNN for fabric defect detection, and mapping the probability to a binary classification, where a defective sample is defined as a positive sample P; two types of samples, false negative (FN) and false positive (FP) are generated; in an actual industrial environment, a number of fabrics with defects is much smaller than a number of fabrics without defects during mass production, that is, a number of positive samples P is much smaller than a number of negative samples N; a larger number of positive samples P and negative samples N that need to be manually reviewed and verified means a greater cost in manual review and verification; and a test result shows that the FN samples provided by an R-CNN network classifier for fabric defect detection are mostly close to a classification threshold, and an FN sample higher than the classification threshold is classified as a defective sample; after the classification threshold reduction (CTR) is conducted, FN samples classified as non-defective samples by a detection system are reclassified as defective samples to reduce an occurrence frequency of the FN samples; the reclassifying is conducted to better divide positive and negative categories of fabric samples and reduce the cost of manual review.

The present disclosure has the following advantages:

The present disclosure creates a reliable data set covering most types of fabric defects. The present disclosure proposes a novel R-CNN model for fabric defect detection. The model provides a desirable feature detection accuracy, has a low running cost, and is easy to implement, such that the model can be better applicable to actual operations in an industrial environment. In the present disclosure, a CTR-based model optimization method is proposed to better divide the positive and negative categories of fabric samples. This method reduces the number of FN results, improves the accuracy of classification, and reduces the cost of manual identification.

BRIEF DESCRIPTION OF THE DRAWINGS

FIG. 1 shows a structural schematic diagram of the R-CNN model for fabric defect detection in an example of the present disclosure.

DETAILED DESCRIPTION OF THE EMBODIMENTS

The present disclosure is further described below with reference to the accompanying drawings and examples.

The present disclosure provides a fabric defect detection method, including the following steps:

step 1: constructing a data set;

to address the problem of underrepresented defect types on existing datasets, adopting four different data sets; in addition to three existing data sets (TILDA, MVTec, and Stains), a new self-built data set is constructed to have a more general data set that better represents many different defect types observed in production environments; the self-built data set includes two parts for a training phase and a testing phase, respectively; and the three existing data sets are only used during the testing phase; and the self-built data set is constructed with images from two different sources, namely fabric defect sample images from Cotton Incorporated and fabric images from network; the fabric defect sample images from Cotton Incorporated include 194 512×512 fabric images in six defect types, for comprehensive representation of fabric defect categories; in order to supplement and increase a number of samples in the self-built data set, the fabric images from network include texture images in six defect types, where each defect type includes 200 non-defective image samples and 10 defective image samples, there is only one defect in each image, a total of 1,454 images are used as samples, and the images are annotated with an open source tool Labelme.

step 2: preprocessing the data set;

(1) image size adjustment:

considering adapting to the computer configuration in a general industrial environment, an image size should be reduced compared to an original size to improve a training efficiency; scaling the fabric defect sample images from Cotton Incorporated and the fabric images from network in the self-built data set through a resize function; and on the basis of an original image aspect ratio of 512×512, conducting shrinking and testing, finding an image size suitable for the R-CNN model, and determining that an input size is fixed at 150×150; and (2) gray level transformation:

a gray level of each pixel is a weighted average of three monochromatic colors red (R), green (G), and blue (B):

$$D = 0.299R + 0.587G + 0.114B$$

converting the images in the self-built data set into a gray level histogram, where the gray level of the pixel falls between 100 and 200, and details cannot be highlighted; correcting the gray level of the pixel in the image by gray level histogram equalization, so as to improve an image quality, display more details, increase an image contrast, highlight image defect features or suppress unwanted noise in the image, and emphasize a difference between an uniform fabric structure and a defect area; a formula of the gray level histogram equalization is as follows:

$$h(v) = \text{round}\left(\frac{cdf(v) - cdf(\min)}{cdf(\max) - cdf(\min)}\right) \times (L - 1)$$

L=256 is a gray level series, cdf is a cumulative distribution function, and min and max are minimum and maximum gray levels in the gray level histogram, respectively; and a round function returns an integer result after decimal rounding.

step 3: constructing a region-based convolutional neural network (R-CNN) model for fabric defect detection; where as shown in FIG. 1, the R-CNN model for fabric defect detection includes the four convolutional layers, the four max-pooling layers, and the two fully connected layers; the four max-pooling layers each have a convolution kernel size of 2×2; the following table shows the four convolutional layers, the four max-pooling layers, and the two fully connected layers, as well as hyperparameters, and an input image is 150×150×1; F represents a number of feature maps, K represents the convolution kernel size, S represents a convolutional stride, and p represents padding.

| Layer | Output feature map | Hyperparameter |
|---|---|---|
| Conv1 | 150 × 150 × 64 | F = 64, K = 5, S = 1, p = 2 |
| Max-pool 1 | 75 × 75 × 64 | S = 2 |
| Conv2 | 75 × 75 × 64 | F = 64, K = 5, S = 1, p = 2 |
| Max-pool 2 | 38 × 38 × 64 | S = 2 |
| Conv3 | 38 × 38 × 128 | F = 128, K = 3, S = 1, p = 2 |
| Max-pool 3 | 13 × 13 × 128 | S = 3 |
| Conv4 | 13 × 13 × 128 | F = 128, K = 3, S = 1, p = 2 |
| Max-pool 4 | 5 × 5 × 128 | S = 3 |
| Fully connected layer 1 | 256 | Neuron 256 |
| Fully connected layer 2 | 128 | Neuron 128 |

A neuron activation function is ReLu. A loss function adopts binary cross-entropy "binary_crossentropy", with a formula as follows:

$$\text{Loss} = \frac{-1}{N} \sum_{i=1}^{N} yi \cdot \log(p(yi)) + (1 - y_i)\log(1 - p(yi))$$

$y_i$ is a label with a value of 1; and p(yi) is a prediction result of N samples, that is, a probability that a sample is a defective image.

step 4: training the R-CNN model for fabric defect detection:

conducting visualizing intermediate activation, and visually displaying the feature maps output by each of the four convolutional layers and the four max-pooling layers in a R-CNN to verify a training situation of the network; where the visualizing intermediate activation is conducive to displaying characteristics of false positive and false negative samples to better debug the R-CNN model;

setting "batch_size" to 8, such that the R-CNN model selects batches of data each time during the training to allow processing to improve a training speed; and

training the R-CNN model for fabric defect detection with a data-enhanced self-built data set; and testing the R-CNN model fabric defect detection on the four different testing data sets; the loss function achieves an optimal degree of convergence when the number of iterations is adjusted to 120 Epoch.

step 5: reducing a number of false negative (FN) samples by classification threshold reduction.

outputting a probability that a predicted image is a defect function through sigmoid using the fully connected layer 2 of the R-CNN for fabric defect detection, and mapping the probability to a binary classification, where a defective sample is defined as a positive sample P; two types of samples, false negative (FN) and false positive (FP) are generated: in an actual industrial environment, a number of fabrics with defects is much smaller than a number of fabrics without defects during mass production, that is, a number of positive samples P is much smaller than a number of negative samples N; a larger number of positive samples P and negative samples N that need to be manually reviewed and verified means a greater cost in manual review and verification; and a test result shows that the FN samples provided by an R-CNN network classifier for fabric defect detection are mostly close to a classification threshold, and an FN sample higher than the classification threshold is classified as a defective sample: after the classification threshold reduction (CTR) is conducted, FN samples classified as non-defective samples by a detection system are reclassified as defective samples to reduce an occurrence frequency of the FN samples; the reclassifying is conducted to better divide positive and negative categories of fabric samples and reduce the cost of manual review.

Example

The performance of R-CNN for fabric defect detection was compared with that of advanced algorithms for fabric defect detection. In the comparison, GLCM and LBP were selected to conduct feature extraction, SVM and FFN were used as classifiers, and measurement indicators were Loss, Accuracy, recall, and precision.

$$Accuracy = \frac{TP + TN}{TP + TN + FN + FP}$$

$$Recall = \frac{TP}{TP + FN}$$

$$Precision = \frac{TP}{TP + FP}$$

|  | Accuracy | Recall | Precision |
|---|---|---|---|
| R-CNN for fabric defect detection | 0.755 | 0.885 | 0.728 |
| LBP + SVM | 0.679 | 0.6738 | 0.684 |
| GLCM + SVM | 0.652 | 0.776 | 0.656 |
| LBP + FFN | 0.678 | 0.729 | 0.678 |

In all combinations, the proposed CNN achieved better results.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

What is claimed is:

1. A fabric defect detection method, comprising the following steps:

step 1: constructing a data set, comprising:

adopting four different data sets, wherein in addition to three existing data sets of TILDA, MVTec, and Stains, a new self-built data set is constructed; the self-built data set comprises two parts for a training phase and a testing phase, respectively; and the three existing data are only used during the testing phase; wherein the self-built data set comprises images from two different sources in include fabric defect sample images from Cotton Incorporated and fabric images from network; the fabric defect sample images from Cotton Incorporated comprise 194 512×512 fabric images in six defect types for comprehensive representation of fabric defect categories: in order to supplement and increase a number of samples in the self-built data set, the fabric images from network comprise texture images in six defect types, wherein each defect typo comprises 200 non-defective image samples and 10 defective image samples, there is only one defect in each image, a total of 1,454 images re used as samples, and the images e an ed with an open source tool Labelme;

step 2: preprocessing the data set;

step 3: constructing a region-based convolutional neural network (R-CNN) model for fabric defect detection; wherein the R-CNN model for fabric defect detection comprises four convolutional layers, four max-pooling layers, and two fully connected layers;

step 4: training the R-CNN model for fabric defect detection; and step 5: reducing a number of false negative (FN) samples by classification threshold reduction.

2. The fabric defect detection method according to claim 1, wherein step 2 specifically-comprises:

(1) image size adjustment:

scaling the fabric defect sample images from Cotton Incorporated and the fabric images from network in the self-built data set through a resize function; and on the basis of an original image aspect ratio of 512×512, conducting shrinking and testing, finding an image size suitable for the R-CNN model, and determining that an input size is fixed at 150×150; and (2) gray level transformation:

a gray level of each pixel in the image is a weighted average of three monochromatic colors red (R), green (G), and blue (B):

$$D=0.299R+0.587G+0.114B$$

converting the images in the self-built data set into a gray level histogram, wherein the gray level of the pixel falls between 100 and 200, and details cannot be highlighted; correcting the gray level of the pixel in the image by gray level histogram equalization;

a formula of the gray level histogram equalization is as follows:

$$h(v) = \text{round}\left(\frac{cdf(v) - cdf(\text{min})}{cdf(\text{max}) - cdf(\text{min})}\right) \times (L-1)$$

L=256 is a gray level series, cdf is a cumulative distribution function, and min and max are minimum and maximum gray levels in the gray level histogram, respectively; and a round function returns an integer result after decimal rounding.

3. The fabric defect detection method according to claim 2, wherein step 3 specifically comprises:

the R-CNN model for fabric defect detection comprises the four convolutional layers, the four max-pooling layers, and the two fully connected layers;

each of the four convolutional layers is connected with one of the four max-pooling layers, and a last one of the four max-pooling layers is sequentially connected with the two fully connected layers; the four max-pooling layers each have a convolution kernel size of 2×2; the following table shows the four convolutional layers, the four max-pooling layers, and the two fully connected layers, as well as hyperparameters, and an input image is 150×150×1;

| Layer | Output feature map | Hyperparameter |
|---|---|---|
| Conv1 | $150 \times 150 \times 64$ | F = 64, K = 5, S = 1, p = 2 |
| Max-pool 1 | $75 \times 75 \times 64$ | S = 2 |
| Conv2 | $75 \times 75 \times 64$ | F = 64, K = 5, S = 1, p = 2 |
| Max-pool 2 | $38 \times 38 \times 64$ | S = 2 |
| Conv3 | $38 \times 38 \times 128$ | F = 128, K = 3, S = 1, p = 2 |
| Max-pool 3 | $13 \times 13 \times 128$ | S = 3 |
| Conv4 | $13 \times 13 \times 128$ | F = 128, K = 3, S = 1, p = 2 |
| Max-pool 4 | $5 \times 5 \times 128$ | S = 3 |
| Fully connected layer 1 | 256 | Neuron 256 |
| Fully connected layer 2 | 128 | Neuron 128 |

F represents a number of feature maps, K represents the convolution kernel size, S represents a convolutional stride, and p represents padding; and a neuron activation function is ReLu; and a loss function adopts binary cross-entropy loss, with a formula as follows:

$$\text{Loss} = \frac{-1}{N}\sum_{i=1}^{N} yi \cdot \log(p(yi)) + (1 - y_i)\log(1 - p(yi))$$

$y_i$ is a label with a value of 1; and (y) is a prediction result of N samples, that is, a probability that a sample is a defective image.

4. The fabric defect detection method according to claim 3, wherein step 4 comprises:

conducting visualizing intermediate activation, and visually displaying the feature maps output by each of the four convolutional layers and the four max-pooling layers in a R-CNN to verify a training situation of the network; wherein the visualizing intermediate activation is conducive to displaying characteristics of false positive and false negative samples to better debug the R-CNN model;

setting "batch_size" to 8, such that the R-CNN model selects batches of data each time during the training to allow processing to improve a training speed; and training the R-CNN model for fabric defect detection with a preprocessed self-built data set obtained in step 2 until the loss function reaches an optimal degree of convergence; and testing the R-CNN model for fabric defect detection on the four different testing data sets.

5. The fabric defect detection method according to claim 4, wherein step 5 comprises:

outputting a probability that a predicted image is a defect function through sigmoid using the fully connected layer 2 of the R-CNN for fabric defect detection, and mapping the probability to a binary classification, wherein a defective sample is defined as a positive sample P; two types of samples, false negative (FN) and false positive (FP) are generated; in an actual industrial environment, a number of fabrics with defects is much smaller than a number of fabrics without defects during mass production, that is, a number of positive samples P is much smaller than a number of negative samples N; a larger number of positive samples P and negative samples N that need to be manually reviewed and verified means a greater cost in manual review and verification; and a test result shows that the FN samples provided by an R-CNN network classifier for fabric defect detection are mostly close to a classification threshold, and an FN sample higher than the classification threshold is classified as a defective sample; after the classification threshold reduction is conducted, FN samples classified as non-defective samples by a detection system are reclassified as the defective samples to reduce an occurrence frequency of the FN samples; the reclassifying is conducted to better divide positive and negative categories of fabric samples and reduce the cost of manual review.

\* \* \* \* \*